United States Patent Office 3,033,722
Patented May 8, 1962

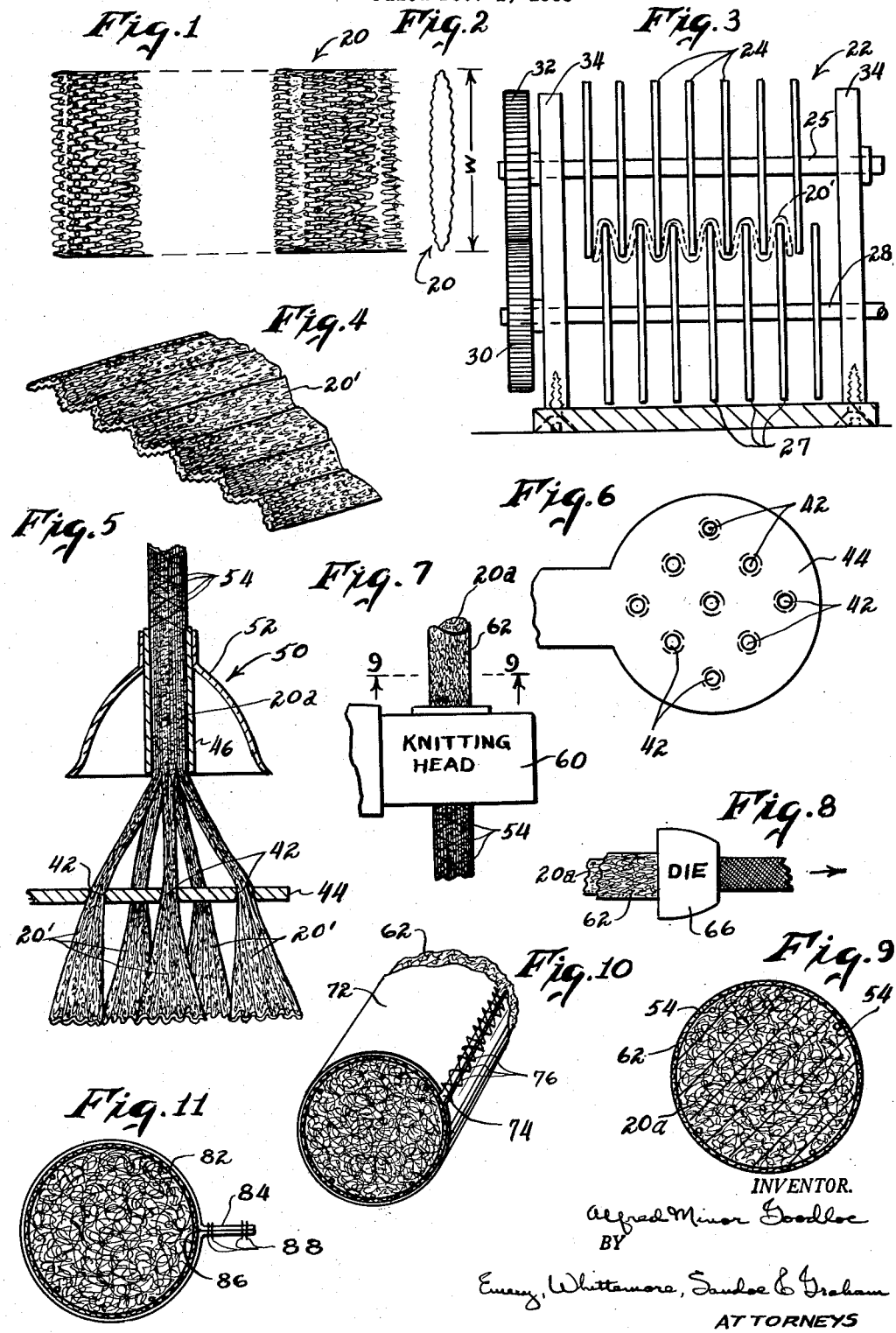

3,033,722
COMPRESSIBLE METAL GASKET AND METHOD OF MAKING SAME
Alfred Minor Goodloe, Westfield, N.J., assignor to Metal Textile Corporation, Roselle, N.J., a corporation of Delaware
Filed Dec. 1, 1959, Ser. No. 856,556
15 Claims. (Cl. 154—46)

This invention relates to gaskets; and more especially to metal gasketing material.

Before the advent of airplanes, army tanks and various other types of equipment, the requirements for gaskets were very simple, such as for pipe flanges and other applications in the steam fitting industry, and for certain types of closures such as handways or manways and to give access to columns or vessels used in chemical or like industries. The requirements for most of these gaskets were primarily intended for sealing against leakage of fluid, and such gaskets did not have to compress or recover more than a few thousandths of an inch; this could be accomplished with a gasket no more than one sixteenth to one eighth inch in thickness, usually made of rubber or rubber compounded with asbestos.

In many modern equipment applications, such as in airplanes and army tanks there is a requirement for a gasketing material which is capable of compressing in some cases as much as 40 to 50% of its original thickness and sometimes as much as ¼ to ½ of an inch. Furthermore, these gaskets for modern equipment have to stand very high temperatures far beyond the point which would enable them to be made of any organic material, such as rubber or plastic. It is necessary that these gaskets be made of all metal, or at least that the core of the gasket be al metal. A cover of asbestos or similar material sometimes may be used around the core.

The difficult problem, with all metal gaskets of the character indicated, has been to obtain the necessary compression with relatively low pressure per square inch, and to obtain a gasketing material which will recover to 90 to 95% of its original thickness when the pressure has been removed.

It is an object of this invention to provide an improved gasket, or gasketing material, which is capable of providing the wide range of thickness for uses of the character indicated, and which can be compressed to the required degree without impairing its ability to recover to substantially its original thickness. Another object is to provide an improved gasketing material made of knitted wire mesh.

More particularly, it is an object of this invention to provide an improved gasketing material made of knitted wire mesh with a longitudinal crimp in the wire mesh material and with the material bunched together to concentrate a multiplicity of the strands in a relatively small cross section. The gasketing material produced has spring action not only in the loops of the knitted mesh but also in the crimps formed in the material. Experience has shown that the longitudinal crimps provide the greater portion of the springiness of the finished gasketing material, and an important advantage of the longitudinal crimps is that the knitted mesh material can be bunched by pulling through a die without destroying the crimps.

Other objects, features and advantages of this invention will appear or be pointed out as the description proceeds.

In the drawing, forming a part hereof, in which like reference characters indicate corresponding parts in all the views;

FIGURE 1 is a diagrammatic view showing a flattened tube made of knitted wire mesh material;

FIGURE 2 is a diagramatic end view of the knitted wire mesh tube as shown in FIGURE 1;

FIGURE 3 is a diagramatic view, on a larger scale than FIGURES 1 and 2, showing the way in which the knitted wire mesh tube of FIGURES 1 and 2 is longitudinally crimped by passing it through a crimping mill;

FIGURE 4 is a fragmentary, perspective view showing the condition of the knitted mesh tube after it has passed through the crimping mill shown in FIGURE 3;

FIGURE 5 is a diagrammatic sectional view, on a reduced scale, showing the way in which a group of longitudinally crimped flattened tubes are drawn together through a die for making a core consisting of a number of the longitudinally crimped flattened tubes bunched together;

FIGURE 6 is a top plan view of the plate shown in FIGURE 5 for bunching together the individual, longitudinally crimped tubes before the tubes are brought together to form a core;

FIGURE 7 is a diagrammatic view showing the way in which the knitted wire mesh core of FIGURE 5 can be passed through a knitting head for applying a covering to the outside of the core;

FIGURE 8 is another diagrammatic view showing the way in which the core, made of knitted wire mesh material bunched together, can be passed through a drawing die for further reducing the diameter of the core and increasing the density of the wire strands within the core;

FIGURE 9 is a greatly enlarged sectional view taken on the line 9—9 of FIGURE 7;

FIGURE 10 is an enlarged sectional view showing a modified construction from FIGURE 9, and one in which the cover is provided with a longitudinal seam stitched together along the length of the gasketing material; and FIGURE 11 is a view similar to FIGURE 9 but showing a modified construction of the cover.

FIGURE 1 shows a length of knitted, springy wire mesh material or tube 20 made of knitted wire mesh material. The tube is preferably knitted in the form of a cylinder and then flattened. The wires must be flexible and of small diameter though the material used for the wires and the cross section depends upon the particular use for which the knitted wire mesh material is intended, and particularly the number of flattened tubes which are to be bunched together to make a core for a gasket. The width of the strip formed by the flattened tube also depends upon the construction of the intended core of the gasketing material. Knitted wire mesh tubes are well known, and they have been used in certain types of gaskets, so no further explanation of the construction of the tubing itself is necessary for a complete understanding of this invention.

It has been found that a more even distribution of the springlike material is obtained with corresponding better results when two or more layers of the knitted mesh material are used for each length of knitted mesh which is to be bunched together. FIGURE 2 shows a flattened tube which provides two layers of knitted mesh material, but it will be understood that two such tubes may be placed one over the other to provide four layers of material before passing the material through the crimper and before bunching the material together as will be described in connection with FIGURE 5.

The flattened tube 20 is passed through a crimping mill 22, shown in FIGURE 3. In this mill there are a number of crimping disks 24 on an upper shaft 25; and there are other crimping disks 27 secured to a lower shaft 28. The disks 24 and 27 are in staggered relation to one another and they overlap one another for a distance equal to the desired depths of the crimp which is to be put into the knitted wire mesh tubing 20.

The two shafts 25 and 28 of the crimping mill 22 are preferably power driven so as to rotate the disks 24 and 27 that are secured to the shafts 25 and 28. The shaft 28 is driven from a motor or other suitable source of power and there is a gear 30 secured to one end of the shaft 28. This gear 30 meshes with a corresponding gear 32 secured to the end of the upper shaft 25. The shafts 25 and 28 rotate in bearing posts 34. Rotation of the shaft 28 in one direction causes the shaft 25 to rotate in the opposite direction and in this way the disks 27 and 24 are rotated in opposite direction and draw the flattened tube 20 forward through the crimping mill.

The original width of the flattened tube 20, indicated by the reference dimension arrow W, in FIGURE 2, is somewhat greater than the width of the crimping mill 22. For example, the dimension W may be approximately six inches and the width of the flattened tube after crimping may be approximately five inches, when the depth of crimp produced by the crimping mill 22 is about 5/16 inch and the pitch of the crimps, that is, the distance between the peaks of the crimps, is approximately 3/8 inch. These figures are given merely by way of illustration.

FIGURE 4 shows the condition of the flattened tube after it has passed through the crimping mill 22. The knitted wire mesh material with the longitudinal crimps, as shown in FIGURE 4, is indicated by the reference character 20'. The next step is gathering and crowding the crimps together and compressing them transversely into a core of a cross section that causes the wires of the material to exert a substantial outward radial pressure. This may be done simultaneously to a group of separate lengths as shown in FIGURE 5.

A number of separate lengths of the longitudinally crimped knitted mesh material 20' are brought through openings 42 in a die plate 44. Each length of material 20', as it is drawn through an opening in the die plate 44, is bunched together to form a substantially cylindrical core, but the longitudinal crimping is not disturbed by pulling the material 20' through the die plate 44 because the crimps extend in the direction in which the pull is exerted. In the manufacture of certain gasket material of the prior art, where crimps did not extend longitudinally, any attempt to bunch the material as in FIGURE 5 had an adverse effect upon the crimps and tended to pull the crimps out flat or at least destroy a substantial part of the crimping.

If only one length of crimped material is used to make the core, the operation is similar to FIGURE 5 but with only one length of the crimped material 20' pulled through the die plate 44.

Immediately above the die plate 44, the bunched lengths of knitted mesh material 20' are brought together to form a substantially cylindrical core 20a; and this core 20a is drawn upwardly through a tube 46 of a braider 50. FIGURE 5 shows the braider 50 diagrammatically by illustrating a top 52 of the braider and by illustrating an open type of inner cover or wire braid 54 that surrounds the core 20a as it leaves the braider 50.

The purpose of the open inner cover or braid 54 is merely to hold the core 20a to size until another cover can be knitted over the core 20a or sewed around the core depending upon the type of gasket being made. After the core has been covered, the braid 54 is no longer essential though it does provide some reinforcing for reducing the outward radial pressure of the core against the inside of the cover. The braider 50 is placed as close as possible over the die plate 44 so as to prevent the crowded lengths of crimped mesh material from springing out to a marked degree before they start through the tube 46 of the braider.

After the braid 54 has been put around the bunched strands of crowded mesh material to form the core 20a, the core is passed through a circular knitting machine illustrated diagrammatically in FIGURE 7 and indicated by the reference character 60. This machine knits a cover 62 around the core 20a and over the open mesh braid 54.

FIGURE 9 shows the product as it comes from the knitting head 60, this view being in section and on a greatly enlarged scale. The knitted wire mesh material of the core 20a has the open mesh braid 54 holding it to the desired diameter and has the knitted cover 62 surrounding the entire circumference of the core 20a to complete the gasket.

The knitted mesh material which has been crowded together under substantial pressure in the die plate 44 and in the tube 46 is held together under pressure by the braid 54; and in the final gasket the compressed knitted mesh material exerts a substantial outward radial force at all times against the braid 54 and the cover. It is this restrained spring force which gives the gasket the ability to recover to substantially its original shape when subject to distorting forces.

The cover 62 may be made of different kinds of material, but ordinarily it is made of wire capable of withstanding the same high temperatures as the wires of the core 20a. The cover 62 does not have to have the same springlike material as must be used for the core 20a; but it must be capable of substantial bending without breaking and it is desirable that it not acquire a permanent set which would tend to hold the gasket in a distorted condition and which would resist the force of the springlike material of the core 20a in returning the gasket to its original condition after a distorting force had been removed.

After the cover 62 has been knitted over the core 20a, the gasket is preferably drawn through a die 66, shown in FIGURE 8, for bringing the gasket to a final size and for smoothing out the knitted cover 62.

For many purposes the all-metal gasket shown in FIGURES 8 and 9 is suitable, but in some cases where a better fluid seal is required a special covering is placed over the knitted mesh material core 20a.

FIGURE 10 shows an all metal gasket, such as illustrated in FIGURE 9, with an asbestos cloth outer cover 72 applied over the knitted cover 62. The asbestos cloth is wrapped around the gasket and sewed along a longitudinal seam 74, the stitching being indicated by the reference character 76. Other covering beside asbestos cloth can be used to provide a better seal, provided that the material is capable of withstanding the temperatures to which the gasket will be subjected when in use. When asbestos cloth is used for the cover 72, it is generally treated with a suitable high temperature compound which makes the asbestos cloth produce a better fluid seal.

FIGURE 11 shows a modified form of the invention which is the same as that shown in FIGURE 7 except that the cover 72 is replaced with a different cover 82 having fins 84 extending outwardly from the seam 86 and secured together by stitching 88. This "tadpole" cover has the advantage of providing a fin or flap by which the gasket can be attached around the frame of an opening that the gasket is used to seal.

Various other modifications and changes can be made in the illustrated constructions, and some features can be used in different combinations without departing from the invention as defined in the claims.

What is claimed is:

1. A gasket including a length of knitted, springy wire mesh of substantial width and having substantially straight parallel crimps gathered and crowded together in a core and extending in the same direction as the core, a cover surrounding the core, the cover being of a cross section that restrains the core with the crimps in a gathered and crowded condition, whereby the cover is subject to a constant radial spring force from the crowded crimps of the core for restoring the gasket to its previous shape upon release of a gasket-deforming force.

2. The gasket described in claim 1 and in which the core is made of a plurality of lengths of the springy wire mesh each of which lengths has its crimps separately crowded together and with these lengths of the wire mesh themselves crowded together to make the core.

3. The gasket described in claim 2, and in which the cover includes a braid immediately surrounding the core.

4. The gasket described in claim 3 and in which the braid is made of wire and the braid has an open mesh.

5. The gasket described in claim 1, and in which the cover surrounding the core is a wire braid and there is an outer cover over the wire braid.

6. The gasket described in claim 5 and in which the outer cover is a knitted wire mesh cover.

7. The gasket described in claim 5 and in which the outer cover has a longitudinal seam and stitching along the longitudinal seam for holding the edges of the seam together.

8. The gasket described in claim 5 and in which the outer cover surrounding the core is held tight around the core by fastening means, and the cover has flanges extending beyond the fastening means to provide a long flap for attaching the gasket to a support around an opening with which the gasket is intended to be used.

9. The method of making a gasket from a strip of knitted, springy wire mesh material, which method comprises crimping the material with a plurality of substantially parallel crimps extending in the same direction as the length of the strip, gathering and crowding the crimps together and compressing them transversely into a core of a cross-section that causes the wires of the material to exert a substantial outward radial pressure, and applying a restraining covering over the core while the material is so compressed.

10. The method of making a gasket as described in claim 9 and in which the strip is made by flattening a knitted wire mesh tube, and the tube is crimped while in its flattened condition to provide a plurality of layers of material in the crimped strip.

11. The method of making a gasket as described in claim 10 and in which the restraining covering is applied to the core by braiding wire around the core with the material of the core in a transversely compressed condition.

12. The method of making a gasket as described in claim 11 and in which a wire mesh cover is knitted over the core and over the braid.

13. The method of making a gasket as described in claim 12 and in which the covered core is pulled through a die to reduce it to exact size and to smooth the outside surface of the knitted cover.

14. The method of making a gasket as described in claim 9 and in which a cover is wrapped around the core with a seam of the cover extending longitudinally, and the edges of the seam are connected with one another by stitching them together to hold the cover on the core.

15. The method of making a gasket from a strip of knitted, springy wire mesh material, which method comprises crimping the material with a plurality of substantially parallel crimps extending in the same direction as the length of the strip, gathering and crowding the crimps together and compressing them transversely into a core of a cross-section that causes the wires of the material to exert a substantial outward radial pressure, similarly crimping a plurality of similar strips to form other cores, bringing the cores together to form a substantially cylindrical composite core with the wires of the material distorted to exert a substantial outward radial pressure in the composite core, applying a restraining cover over the cores after they are brought together in the composite core, and then applying an outer cover around said restraining cover with a seam of the outer cover extending longitudinally, and connecting the edges of the seam with one another by stitching them together to hold the outer cover on the composite core.

References Cited in the file of this patent
UNITED STATES PATENTS

| | | |
|---|---|---|
| 2,666,005 | Norehad | Jan. 12, 1954 |
| 2,727,084 | Schreiber | Dec. 13, 1955 |
| 2,816,595 | Hudak | Dec. 17, 1957 |
| 2,924,471 | Poltorak et al. | Feb. 9, 1960 |